United States Patent [19]

Nagano

[11] Patent Number: 4,833,937
[45] Date of Patent: May 30, 1989

[54] ADJUSTING DEVICE FOR A CONTROL CABLE FOR A BICYCLE

[75] Inventor: Masashi Nagano, Izumi, Japan

[73] Assignee: Shimano Industrial Company Limited, Osaka, Japan

[21] Appl. No.: 851,506

[22] Filed: Apr. 14, 1986

[30] Foreign Application Priority Data

Apr. 22, 1985 [JP] Japan ................................ 60-86162
Nov. 18, 1985 [JP] Japan ......................... 60-177678[U]

[51] Int. Cl.⁴ ............................................. F16C 1/10
[52] U.S. Cl. .................. 74/501.5 R; 474/82; 74/502.4; 74/502.6
[58] Field of Search .............. 403/359; 74/527, 500.5, 74/501.5 R, 501.6, 502, 502.2, 502.4, 502.5, 502.6; 474/82 X; 280/236, 238

[56] References Cited

U.S. PATENT DOCUMENTS

| 2,434,358 | 1/1948 | Frank | 74/501.5 R |
|---|---|---|---|
| 2,821,277 | 1/1958 | Hughes | 403/359 |
| 3,222,772 | 12/1965 | Leyner | 403/359 |
| 3,546,962 | 12/1970 | Ruhala | 74/501 R |
| 3,580,102 | 5/1971 | Wrabetz | 74/501 R |
| 3,811,338 | 5/1974 | Federspiel | 74/527 |
| 3,960,032 | 6/1976 | Schiff | 74/501 R |
| 4,198,873 | 4/1980 | Nagano et al. | 474/82 |
| 4,238,975 | 12/1980 | Jones | 74/502 |
| 4,334,438 | 6/1982 | Mochida | 74/501 R |
| 4,543,849 | 10/1985 | Yamamoto et al. | 74/501.5 R |

FOREIGN PATENT DOCUMENTS

| 0205260 | 12/1982 | Japan | 60-177678[U] |
|---|---|---|---|
| 8300225 | 3/1984 | PCT Int'l Appl. | 74/501.5 R |
| 2016634 | 9/1979 | United Kingdom | 74/501.5 R |

*Primary Examiner*—Richard E. Moore
*Assistant Examiner*—Vinh Luong
*Attorney, Agent, or Firm*—Stevens, Davis, Miller & Mosher

[57] ABSTRACT

The device adjusts the length of a control cable which is interposed between an operating machine, such as a derailleur, and a control device therefor. The device is provided with a temporary stop mechanism for temporarily, stepwise stopping rotation of an adjuster. The device also includes a clicking mechanism by which an operator senses a clicking action when rotating the adjuster. The stop interval for the clicking mechanism is set to be larger than the minimum incremented stroke of the control cable required for adjustment thereof one increment at a time.

9 Claims, 8 Drawing Sheets

ADJUSTING DEVICE FOR A CONTROL CABLE FOR A BICYCLE

FIELD OF THE INVENTION

This invention relates to an adjusting device for a control cable for a bicycle, and more particularly, to an adjusting device for a control cable interposed between an operating machine, such as a derailleur, and a control device therefor.

BACKGROUND OF THE INVENTION

Conventionally, a bicycle control cable is interposed between, for example, a derailleur and a control device therefor which includes an operating lever for operating the derailleur. The operating lever is operated to actuate the derailleur through a control wire so that a chain guide constituting an element of the derailleur shifts a driving chain from one sprocket to another of a multistage sprocket assembly.

The aforesaid control device, such as a lever shifting device, is provided with a positioning mechanism for positioning the operating lever in the operation position corresponding to the speed-change stage. The positioning mechanism comprises a plurality of engaging portions corresponding to the number of speed-change stages, a retainer in the form of, for example, a ball engageable selectively with individual engaging portions, and a spring for biasing the retainer toward the engaging portions. The engagement of the retainer with one engaging portion positions the lever corresponding to the selected speed-change stage so that the lever is maintained in this position against a return spring. Hence, the lever can keep the chain guide of the derailleur in position corresponding to a desired selected particular sprocket of the multistage sprocket assembly. However, when the control wire, after numerous repetitions of speed-change operation, becomes extended in length relative to an outer sheath of the control cable, the stroke of the operating lever remains constant corresponding to an operation interval set by the positioning mechanism, whereby the extended control wire conversely causes an insufficient movement of the chain guide.

The lever shifting device provided with the positioning mechanism holds the operating lever in position corresponding to the selected speed change stage, so that the operating lever cannot be rotated an additional amount even when the control cable has become extended, whereby the movement of the chain guide falls short of its necessary movement to yield an effective and optimal speed change operation. As a result, the movement of the chain guide becomes improper with respect to each desired sprocket, whereby the chain guide stops out of the stable region thereof.

Hence, the chain shifted by the chain guide is slanted with respect to the sprocket to engage with the chain so as to make contact with the chain guide or the tooth crest of the sprocket, resulting in the production of noises.

To solve the above problem, the derailleur is provided with an adjusting bolt which is rotated to adjust the position where the outer sheath is held to thereby change the length thereof relative to the control wire, thereby correcting the chain guide to be kept in the stable region.

It is noted that the aforesaid stable region is defined as a region where the chain is shifted by the chain guide to a desired sprocket without striking the desired sprocket or the chain guide, which has a fixed width with respect to the sprocket.

However, the above solution is inadequate because, in a case where the adjusting bolt is rotated to adjust the control cable when the chain strikes the sprocket or the chain guide, it is unknown to what extent the chain guide has moved out of the stable region and also there is no standard for adjusting the length of the control cable. Hence, the adjustment may be insufficient to result in an increase in the frequency of adjustment, thereby creating a problem in that the sprocket and chain guide will cause frequent wearing thereof.

In addition, a control cable for a bicycle brake has the same problem as described above.

SUMMARY OF THE INVENTION

An object of the invention is to provide an adjusting device for adjusting a length of a control cable for operating a bicycle derailleur or the like. The device allows an operator to sense a clicking interaction of components of the adjusting device when operating the device to carry out a stepwise or incremental adjustment of the length of the control cable while minimizing the incremental amount of the adjustment to correspond to the above-mentioned stable region of the chain guide of the derailleur, thereby reducing the frequency of adjustment.

The adjusting device of the invention for adjusting a control cable which comprises a control wire and an outer sheath and which is interposed between an operating mechanism, such as a derailleur, and a control device for the operating mechanism, is characterized by providing (i) a mounting member provided at, for example, the bicycle derailleur, (ii) an adjuster mounted to the mounting member to be rotatable and axially movable relative thereto; the adjuster including a shaft having an insertion bore for the control wire and a receiving portion or socket for the outer sheath, (iii) a temporary stop means for temporarily stepwise or incrementally stopping rotation of the adjuster, and (iv) a clicking mechanism by which an operator, when operating the adjuster, senses a clicking action within the adjusting device, so that the stop interval or increment for the temporary stop means is larger than the minimum incremental adjustment for the control cable by rotating the adjuster.

Thus, the temporary stop means can perform stepwise adjustment of the relative length of the control wire to the outer sheath, and the clicking mechanism enables the operator to sense a clicking action when operating the adjuster, so as to ensure an effective proper adjustment. The stop interval set by the temporary stop means is larger than the minimum incremental adjustment length for the control cable, whereby the adjustment one increment at a time can adjust the cable by a desired length and reduce the frequency of adjustment.

In particular, in a case where the cable is adjusted for a derailleur, the stop interval is set on the basis of the width of the stable region for the chain guide, thereby ensuring quick adjustment one increment at a time of the length of the control cable corresponding to the width of the stable region.

The above and further objects of the invention will be more fully apparent from the following detailed description when the same is read in connection with the accompanying drawings.

DETAILED DESCRIPTION OF THE DRAWINGS

DETAILED DESCRIPTION OF THE INVENTION

Figure 6:
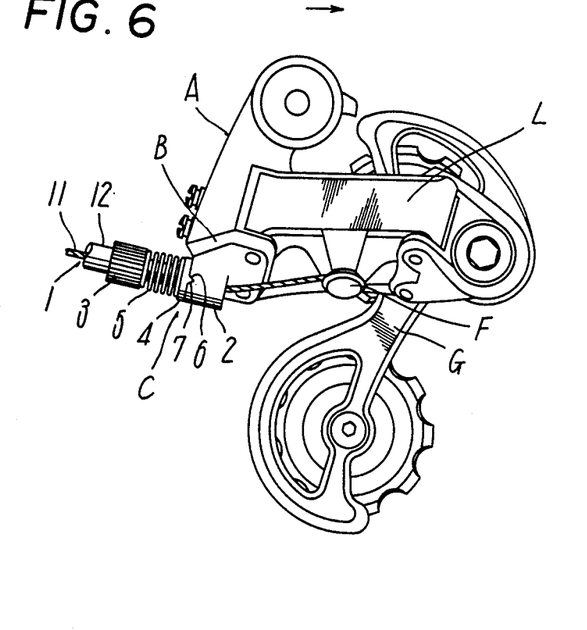
FIG. 6 is an illustration of the service condition of the adjusting device of the invention.

The adjusting device of the present invention adjusts the relative length of a control wire 11 to an outer sheath 12 at a control cable 1 interposed preferably between a derailleur shown in FIG. 6 and a lever shifting device (not shown). The first embodiment of the adjusting device of the invention shown in FIGS. 1 through 4 is incorporated in the derailleur in FIG. 6.

Figure 1:
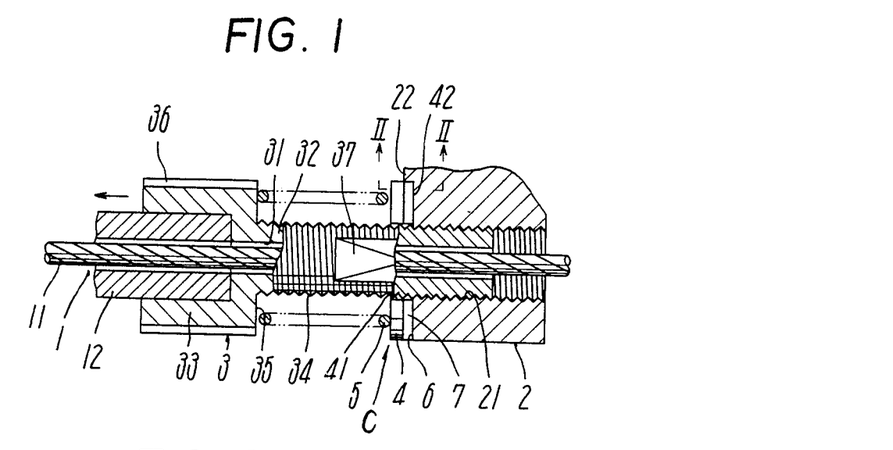
FIG. 1 is a longitudinal sectional view of a first embodiment of an adjusting device of the invention for adjusting a control cable of a bicycle.
Figure 2:
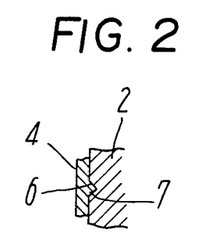
FIG. 2 is a sectional view taken on the line II—II in FIG. 1.
Figure 3:
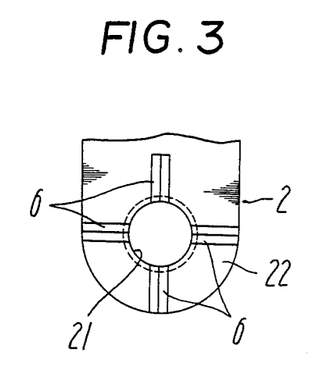
FIG. 3 is a side view of a mounting member according to the invention.

The first embodiment of the adjusting device comprises a mounting member 2 integral with a fixing member B at the derailleur A and having a threaded bore 21, an adjuster 3 screwable with the threaded bore 21 and rotatable to move axially, and a clicking mechanism C having a temporary stop means for temporarily stepwise stopping the rotation of adjuster 3 and providing structure giving a clicking feeling to the operator when the adjuster is rotated.

The adjuster 3 comprises a shaft 32 having at the center an insertion bore 31 for the control wire 11 and a receiving portion or socket 33 for receiving therein the outer sheath 12. Shaft 32 is provided at its outer periphery with a screw thread 34 engageable with the threaded bore 21 at the mounting member 2 and chamfered portions 37 having a non-round section. Socket 33 is larger in diameter than the shaft 32 and has at its end a stepped portion 35. Socket 33 is provided at its outer periphery with a rotary-operating portion 36 formed preferably of serrations.

The temporary stop means at the clicking mechanism C is provided between a clicking member 4 supported to be nonrotatable relative to the shaft 32 and the mounting member 2 opposite to the clicking member 4. The temporary stop means comprises a plurality of engaging recesses 6, engaging protuberances 7 engageable therewith and for temporarily stopping the rotation of adjuster 3, and a spring 5 elastically biasing the protuberances 7 toward the engaging recesses 6. Engaging recesses 6 are formed at the side surface 22 of the mounting member 3, and engaging protuberances 7 are formed at the side surface 42 of the clicking member 42 opposite to the mounting member 2. Spring 5 is interposed between the clicking member 4 and the stepped portion 35 at the adjuster 3.

A stop interval of the temporary stop means, that is, a circumferential interval between the respective engaging recesses 6, is made larger than the minimum incremental stroke necessary for adjusting the control cable 1 one increment at a time.

Figure 5:
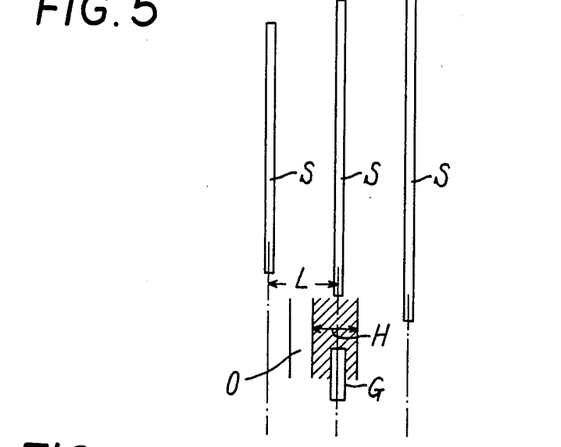
FIG. 5 is an illustration of the stable region for a chain guide.

The stop interval for the control cable 1 used for the derailleur in FIG. 6 is set to be an interval through which the chain guide G at the derailleur is shiftable axially of the multistage sprocket assembly only in a stroke corresponding to a width H of the stable region shown in FIG. 5.

In the first embodiment, the engaging recesses 6 are spaced from each other at 90° intervals. The pitch of the threaded bore 21 and screw thread 34 corresponds to the displacement of the chain guide G in width H of the stable region when the adjuster 3 rotates at a rotation angle of 90° to adjust the relative length of the control wire 11 to the outer sheath 12. In brief, the interval between the stepwise adjustments by the adjuster 3 mates with the width H of the stable region, thereby being larger than a minimum necessary for the incremental adjustment of the control cable one increment at a time.

In addition, the aforesaid stable region constitutes a region where the chain does not make contact with a pulley plate of the chain guide, where an inner plate of the chain does not make contact with the teeth of the sprocket to engage with the chain, or where the edge of a pin at the chain does not make contact with the teeth of a sprocket adjacent to the sprocket to engage with the chain, thereby not producing noises. The width H of the stable region depends on the kinds of sprockets, chain guide and chain employed in the bicycle, the distance between the respective sprockets, the shape of the sprocket teeth, or a difference in the number of teeth of the sprockets.

Figure 4:
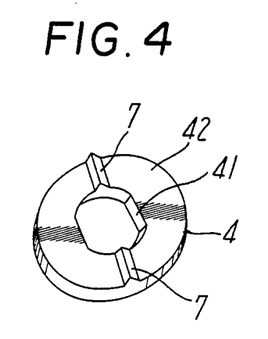
FIG. 4 is a perspective view of a clicking member according to the invention.

The clicking member 4, as shown in FIG. 4, is formed in a disc having at the center a non-round bore 41 mainly of metal into which the non-round portion 37 of adjuster 3 is nonrotatably inserted. Clicking member 4 is disposed opposite to one end face of mounting member 2. Alternatively, the clicking member 4 may be formed of a non-metallic material, such as synthetic resin.

In a case where the clicking member is formed of synthetic resin, for example, a metal plate with engaging projections may be embedded in the clicking member 4 to increase its strength.

The adjusting device constructed as described above is mounted to, for example, a rear derailleur A having a chain guide G as shown in FIG. 6. The control wire 11 having at one end a retainer is inserted through the insertion bore 31 at the adjuster 3, the retainer being retained to the operating lever at the lever shifting device (not shown) having the positioning mechanism for the lever. The other end of operating wire 11 is fixed to, for example, a linkage member L at the derailleur A through a fixture F. Also, one end of the outer sheath 12 is supported to the socket 33 and the other end to a fixing member at the lever shifting device so that the lever is operated to move through the control wire 11 axially of the multistage sprocket assembly and at a constant stroke, thereby shifting the chain to a desired particular sprocket. When the control wire 11 is adjusted to have a proper length relative to the outer sheath 12, the chain guide G is positioned within the width H of the stable region as shown in FIG. 5.

In a case where the wire 11 extends or the outer sheath 12 is shortened after repetition of the speed change operation by the lever to thereby increase the relative length of the wire 11 to the outer sheath 12, the chain guide G stays in the non-stable region O to yield a large slant of the chain with respect to the sprocket S, resulting in noises being produced during the engagement of the chain therewith. In this case, the adjuster 3 is rotated through the rotary control 36 in one action and to an extent of one rotational stroke of the adjuster 3 corresponding to the stop interval set by the temporary stop means, whereby the adjuster 3 moves axially with respect to the mounting member 2, in other words, lengthwise of the control cable 1. Simultaneously, the outer sheath 12 is urged in one action and to an extent of a constant stroke in the direction of the arrow in FIG. 1, thereby adjusting the relative length between the wire 11 and the outer sheath 12 so as to return the chain guide G into the stable region as shown by the arrow in FIG. 5.

In this case, the clicking member 4 rotates together with the adjuster 3, so that the engaging protuberances 7 disengage from the engaging recesses 6 and thereafter engage with those displaced at 90° respectively to thereby enable the operator to feel the clicking action when operating the adjuster 3.

Also, the stop interval of the clicking mechanism C is set to have a rotary angle pitch corresponding to the width H of the stable region, thus, rotation of the adjuster 3 one increment at a time can return the chain guide G with accuracy into the stable region. Also, the chain guide G is moved in one action and to an extent of the width H of the stable region, thereby reducing the frequency of adjustment, and the stepwise adjustment can be carried out to enable the operator to feel the clicking action when operating the adjuster 3.

Figure 7:
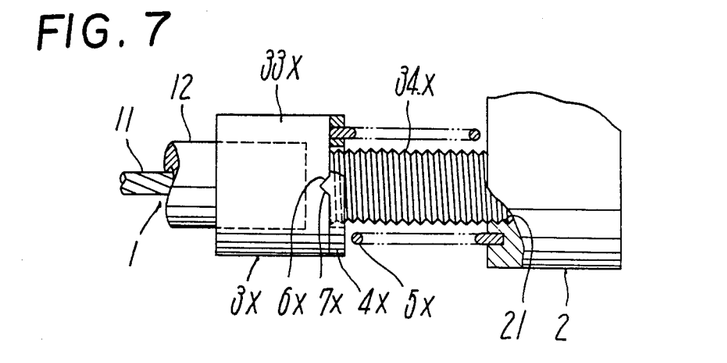
FIG. 7 is a partially cutaway front view of a second embodiment of the invention.

Alternatively, as shown in a second embodiment in FIG. 7, engaging recesses 6X and engaging protuberances 7X may be provided between an adjuster 3X and a clicking member 4X. In this embodiment a click spring 5X is retained at one end to the mounting member 2, and at its other end to the clicking member 4X, thereby preventing the clicking member 4X from rotating together with the adjuster 3X.

Figure 8:
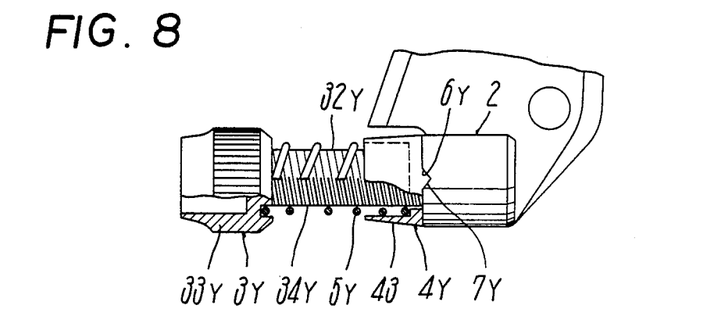
FIG. 8 is a partially cutaway front view of a third embodiment of the invention.

Alternatively, as shown in a third embodiment in FIG. 8, a clicking member 4Y may be provided with a receiving cylinder or socket 43 for holding therein one end of a spring 5Y.

Figure 9:
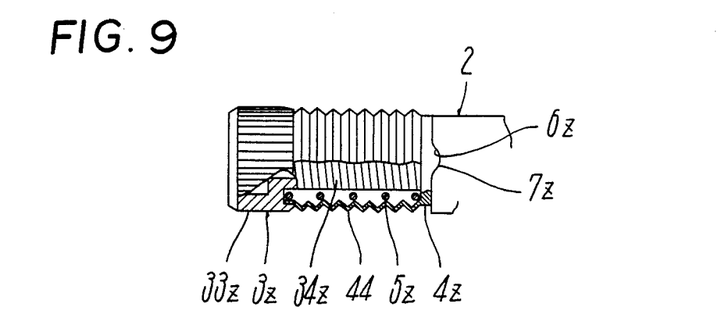
FIG. 9 is a partially cutaway front view of a fourth embodiment of the invention.

Alternatively, as shown in a fourth embodiment in FIG. 9, a clicking member 4Z is provided with a bellows 44 for entirely covering a click spring 5Z.

Next, explanation will be given of a fifth embodiment shown in FIGS. 10 through 14.

Figure 10:
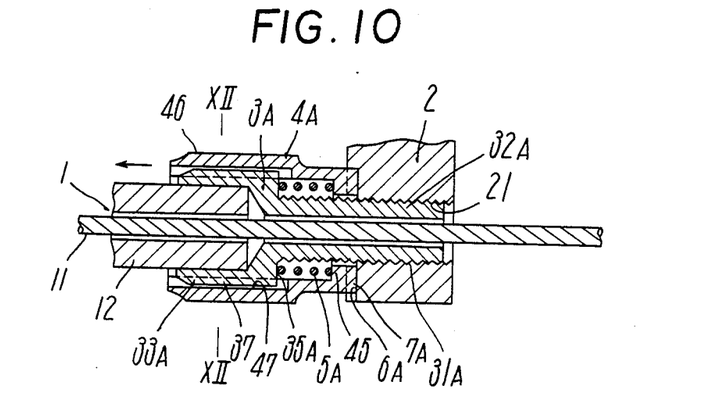
FIG. 10 is a longitudinal sectional view of a fifth embodiment of the invention.
Figure 11:
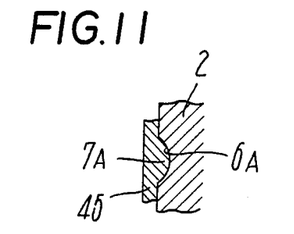
FIG. 11 is an enlarged sectional view of the principal portion of a clicking mechanism according to the invention.
Figure 12:
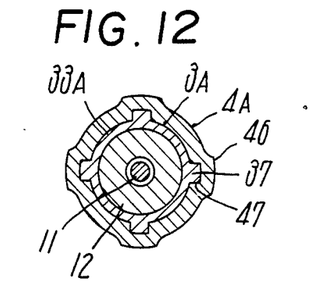
FIG. 12 is a sectional view taken on the line XII—XII in FIG. 10.
Figure 13:
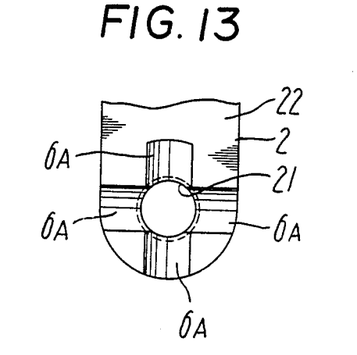
FIG. 13 is a side view of a mounting member of the fifth embodiment.
Figure 14:
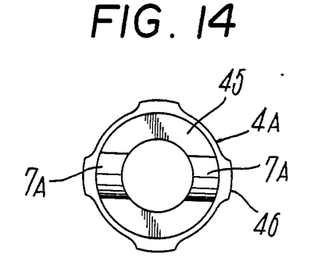
FIG. 14 is a side view of a rotary-operating member according to the invention.

In the fifth embodiment, a clicking member 4A separate from an adjuster 3A comprises a cylindrical member having a bottom 45 and covering the adjuster 3A, with bottom 45 being opposite to the mounting member 2. A temporary stop means comprising engaging recesses 6A and engaging protuberances 7A is provided between the opposite surfaces of the bottom 45 and mounting member 2. A spring 5A is interposed between the inner surface of bottom 45 and the stepped portion 35A at the adjuster 3A. Clicking member 4A is sleeved in spline connection via grooves 47 which engage with ridges 37 into the outer periphery of a socket 33A, and a rotary control 46 is provided at the outer periphery of clicking member 4A.

The clicking member 4A has an inner diameter larger than an outer diameter of the socket 33A and is provided at the inner periphery with grooves 47 engageable with ridges 37 at the outer periphery of the socket 33A, to thereby be nonrotatable with respect to the adjuster 3 through engagement of the ridges 37 with the grooves 47. Thus, the clicking member 4A transmits its rotation to the adjuster 3 and is movable axially with respect thereto. In addition, the rotary control 46 at the clicking member 4A is formed of synthetic resin, but may be formed of metal. When it is formed of synthetic resin, for example, a metal plate having the engaging protuberances 7A may be embedded into the same, thereby increasing its strength.

In the above construction, the operator directly grips the rotary control 46 to rotate therethrough the adjuster 3A while changing the engagement of engaging protuberances 7A with the engaging recesses 6A, thereby having an improved clicking feel. Moreover, the clicking member 4A has a larger outer diameter than the socket 33A at the adjuster 3, whereby the operator can rotate clicking member 4A with a light touch while gripping the larger diameter portion of the clicking member 4A.

Furthermore, since the clicking member 4A covers the entire spring 5A, there is no risk that the spring 5A will be exposed to the exterior and clogged with mud to hinder the adjustment of adjuster 3. Alternatively, in the fifth embodiment, the engaging protuberances 7A may be provided at the mounting member 2 and the engaging grooves 6A may be provided at the bottom 45 of the clicking member 4A.

The clicking mechanism C of the invention may alternatively be constructed as shown in FIGS. 15 through 30.

Figure 15:
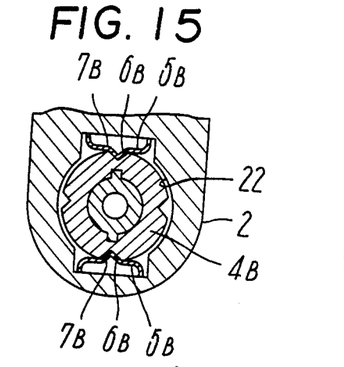
FIG. 15 is a sectional view of a sixth embodiment of the invention.
Figure 16:
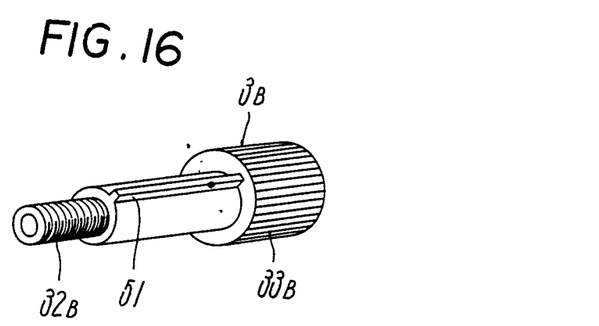
FIG. 16 is a perspective view of an adjuster of the sixth embodiment.

In a sixth embodiment shown in FIGS. 15 and 16, antirotation ridges 51 are provided at a shaft 32B between a socket 33B at an adjuster 3B and a screw thread 34B, so that a clicking member 4B is mounted to be non-rotatable relative to and axially movably on the ridge 51 forming portions. At one end of a threaded bore provided at the mounting member 2 are provided recesses 22 accommodating therein leaf springs 5B having engaging protuberances 7B, and at the outer periphery of the clicking member 4B opposite to the springs 5B are provided engaging recesses 6B respectively.

Figure 17:
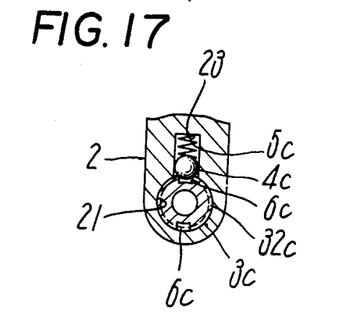
FIG. 17 is a sectional view of a seventh embodiment of the invention.
Figure 18:
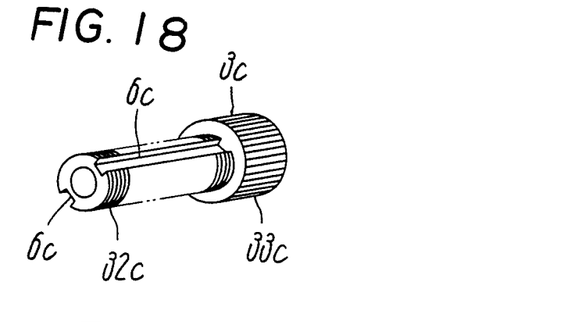
FIG. 18 is a perspective view of an adjuster of the seventh embodiment.

In a seventh embodiment in FIGS. 17 and 18, at the outer periphery of a shaft 32C at an adjuster 3C are provided grooves 6C extending axially of the shaft 32C, and in the threaded bore 21 at the mounting member 2 is provided a recess 23 extending radially thereof, so that a clicking member 4C in the form of a ball and a click spring 5C are housed in the recess 23, the clicking member 4C engaging with each engaging groove 6C.

Figure 19:
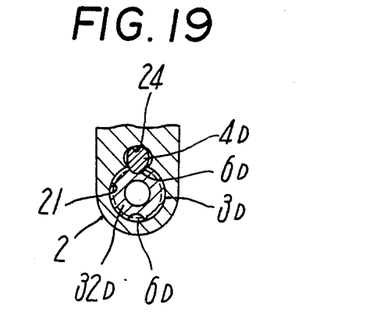
FIG. 19 is a sectional view of an eighth embodiment of the invention.

In an eighth embodiment in FIG. 19, at a shaft 32D of an adjuster 3D are provided engaging grooves 6D extending axially of the shaft 32D and at the threaded bore 21 of mounting member 2 is provided a recess 24 extending radially thereof and housing therein a clicking member 4D formed of rubber or like elastic material, so that the adjuster 3D is rotated to elastically deform the clicking member 4D.

Figure 20:
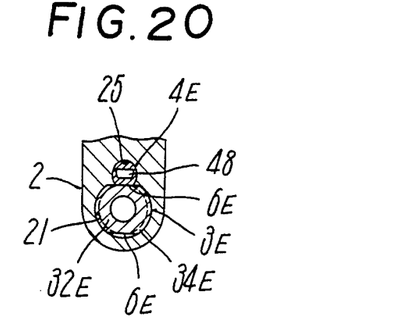
FIG. 20 is a sectional view of a ninth embodiment of the invention.

In a ninth embodiment in FIG. 20, a screw thread 34E at the outer periphery of a shaft 32E at an adjuster 3E is chamfered to form engaging recess 6E and a recess 25 at the mounting member 2 houses therein a clicking body 4E which is elastically deformable and includes a cavity 48.

Figure 21:
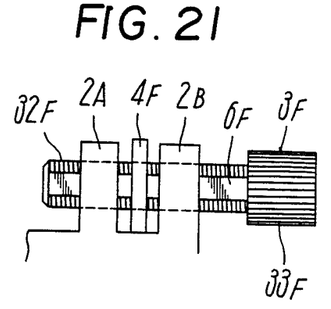
FIG. 21 is a front view of a tenth embodiment of the invention.
Figure 22:
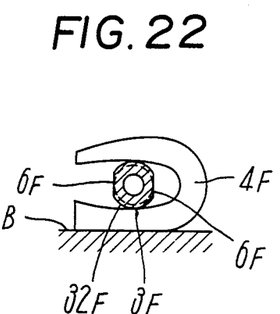
FIG. 22 is a side view of the tenth embodiment, in which an adjuster is illustrated by a cross-cut view at a shaft of the adjuster.

In a tenth embodiment in FIGS. 21 and 22, a shaft 32F at an adjuster 3F is chambered at the surface to form engaging recessed 6F and an elastic substantially U-shaped clicking member 4F is disposed between a pair of mounting members 2A and 2B and fitted at the inner surfaces of two opposite legs onto the shaft 32F, so that the adjuster 3F is rotated to elastically deform the clicking member 4F.

Figure 23:
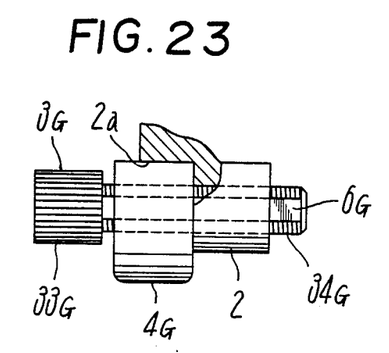
FIG. 23 is a partially cutaway front view of an eleventh embodiment of the invention.
Figure 24:
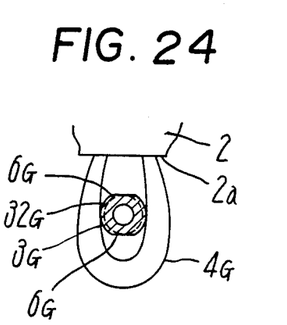
FIG. 24 is a side view of the eleventh embodiment, in which an adjuster is illustrated by a cross-cut view at a shaft of the adjuster.

In an eleventh embodiment in FIGS. 23 and 24, a shaft 32G at an adjuster 3G is chamfered at the outer periphery to form engaging recesses 6G, and an elastic substantially U-shaped clicking member 4G is fitted through the opposite inner surfaces of two legs onto the shaft 32G and makes contact at its open end with one side end face 2A of mounting member 2, thereby preventing the clicking member 4G from rotating together with the adjuster 3G. In addition, in the tenth and eleventh embodiments in FIGS. 21 through 24, the clicking members 4F and 4G, when made to be detachable from the shafts 32F and 32G, can be dismounted therefrom, thereby enabling adjustment of the length of the control cable 1 without having the clicking feel.

Figure 25:
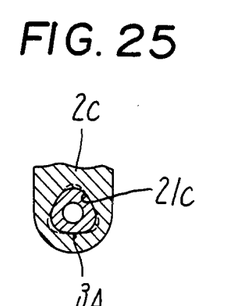
FIG. 25 is a sectional view of a twelfth embodiment of the invention.
Figure 26:
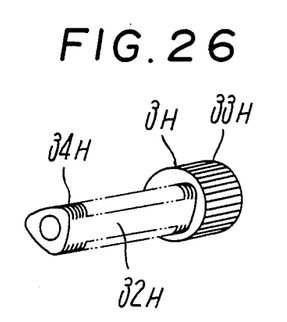
FIG. 26 is a perspective view of the FIG. 25 embodiment.

In a twelfth embodiment in FIGS. 25 and 26, a mounting member 2C is formed of an elastic material, such as synthetic resin, and is provided with a non-round threaded bore 21C. In addition, shaft 32H of adjuster 3H is, for example, triangular in section and provided at the corners with screw threads 34H, so that the shaft 32H is forcibly screwed therewith and the adjuster 3H is rotated to elastically deform the threaded bore 21C. In this embodiment, the screw thread at the bore 21 may be formed by forcibly screwing the screw threads 34H with the bore 21C.

Figure 27:
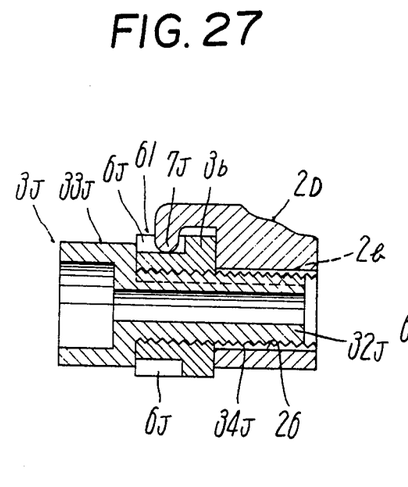
FIG. 27 is a sectional view of a thirteenth embodiment of the invention.
Figure 28:
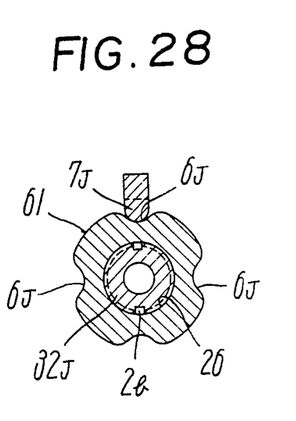
FIG. 28 is a sectional view of an operating member of the thirteenth embodiment.

In a thirteenth embodiment in FIGS. 27 and 28, a shaft 32J at an adjuster 3J is provided at the outer periphery with a screw thread 34J, and an operating member 61 is provided separately from the adjuster 3J. Also, mounting member 2D is provided with a throughbore 26 having lock projections 2b, and the screw thread 34J is fitted axially movably and nonrotatably into the throughbore 26. Operating member 61 screws with the screw thread 34J. Engaging recesses 6J are provided at one of the operating member 61 and mounting member 2D, and an engaging projection 7J is provided at the other, so that the operating member 61 is rotated to move the adjuster 3J axially stepwise.

Figure 29:
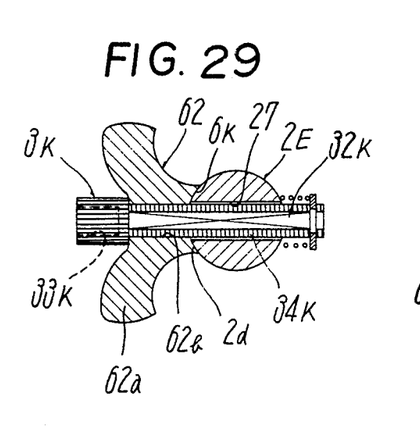
FIG. 29 is a sectional view of a fourteenth embodiment of the invention.
Figure 30:
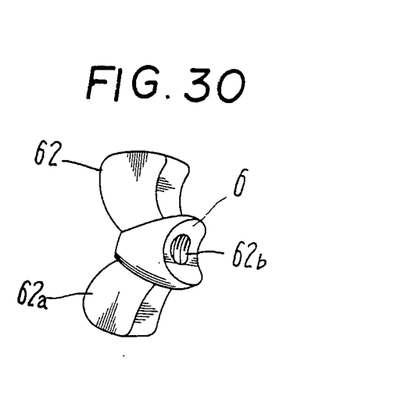
FIG. 30 is a perspective view of an adjuster of the fourteenth embodiment.

In a fourteenth embodiment in FIGS. 29 and 30, a mounting member 2E is provided which has an end face in a circular arc and a throughbore 27 having a locking projection extending radially. An operating member 62 having a rotary control 62a and a threaded bore 62b is formed separately from the adjuster 3K, and a screw thread 34K at a shaft 32K of adjuster 3K is fitted axially movably and non-rotatably into the throughbore 27. Shaft 32K extends outwardly and carries at its utmost end a stopper 63 and a spring 64 for biasing the operating member 3b to the mounting member 2E. Operating member 62 screws with the screw thread 34K and has an engaging recess 6K formed in a circular arc. A temporary stop means is formed which moves the adjuster 3K axially stepwise so that the operator senses the clicking action between the engaging recess 6K and the end face 2d.

Figure 31:
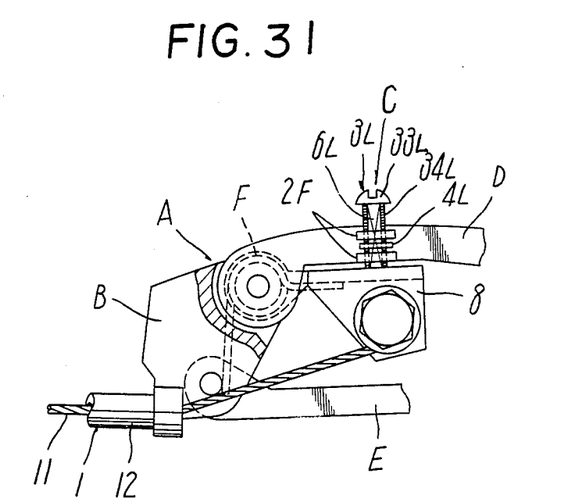
FIG. 31 illustrates other applications of the invention.
Figure 32:
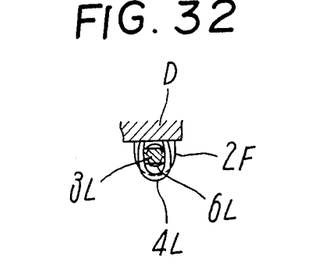
FIG. 32 is a sectional view of the principal portion of the adjusting device in FIG. 31.

Alternatively, as shown in FIG. 31, a holder 78 separate from an adjuster 3L may be formed to fix the control wire 11 and abut against the adjuster 3L through a saver spring F, thereby indirectly holding the wire 11. Hence, the adjuster 3L is rotated to move the holder 8 to adjust the wire 11 in length relative to the outer sheath 12.

In detail, a derailleur A shown in FIG. 31 is provided with a linkage mechanism comprising a fixing member B, a pair of linkage members D and E pivoted thereto, and a movable member (not shown) having a chain guide pivoted to free ends of the linkage member D and E. Fixing member B pivotally supports holder 8 for the control wire 11. Between fixing member B and the holder 8 is provided saver spring F for biasing the holder 8 toward the adjuster 3L mounted to the linkage member D through a mounting member 2F. Hence, even when the chain guide is subjected to a resistance larger than that against the speed change, the saver spring F is deflected and the holder 8 swings, thereby performing the speed change. The adjusting device of the present invention is applied to this type of derailleur with the saver mechanism. The mounting member 2F is provided at the linkage member D or E and screwably supports an adjuster 3L including a shaft 32L having a rotary control 38 and a screw thread 34L. Engaging portions 6L are provided at the screw thread 34L, and an elastic substantially U-shaped clicking member 4L is detachably fitted onto the screw thread 34L and abuts at its open end against the side surface of the linkage member D, thereby preventing the clicking member 4L from rotating together with the adjuster 3L. In addition, in this embodiment, the clicking mechanism, as shown in FIGS. 3, is similar in construction to the eleventh embodiment in FIGS. 23 and 24, but may of course be applied to other embodiments.

In the aforesaid embodiments, the relative length of the control cable 1 comprises control wire 11 and outer sheath 12. In addition, the adjusting device of the present invention may be applied to adjustment of a control cable comprising a control wire 11 only. In this embodiment, the mounting member is provided at, for example, the movable member at the derailleur or the operating lever at the lever shifting device and the adjuster fixes one end of control wire 11 or the retainer thereof.

Alternatively, the adjusting device of the present invention may be mounted on the linkage member or the movable member at the derailleur, and on the control device, such as the lever shifting device, or the bicycle brake.

As is apparent from the above, the adjusting device of the invention is provided with a mounting member, an adjuster mounted thereto and rotatable to move axially, a temporary stop means for stepwise stopping rotation of the adjuster, and a clicking mechanism to enable the operator to sense the clicking action while rotating the adjuster, so that the stop interval of the temporary stop means is set to be larger than the incremental minimum amount of adjustment necessary for adjusting the adjuster one pitch or increment at a time on the basis of the width of the stable region where the chain engages with the sprocket without producing noises. Hence, the adjuster is rotated by only a rotational stroke corresponding to the stop interval, thereby enabling the control cable to be adjusted stepwise in one action to produce a predetermined length adjustment. Thus, the control cable has its relative length adjusted simply, easily and quickly. Furthermore, since the stop interval is set to be larger than the minimum amount of adjustment, the control cable, even when somewhat improper in length, is not required to be adjusted each time, resulting in reduction of the necessary frequency of adjustment.

Moreover, the operator is able to sense the clicking action at every rotary operation of the adjuster, thereby enabling reliable confirmation of adjustment.

Although the invention has been described with reference to several different embodiments, these embodiments are merely exemplary and not limiting of the invention which is defined solely by the appended claims.

What is claimed is:

1. An adjusting device for adjusting a length of a control cable to adjust an operating position of a bicycle derailleur having a chain guide for shifting a driving chain from one sprocket to another of a multi-stage sprocket assembly, said sprocket assembly having sprockets each having a stable region with a predetermined width within which said driving chain can travel thereon without producing noise by contact with said sprocket or said chain guide when said derailleur is in an operation position, whereby to avoid said noise said chain guide is required to be in proper position within said stable region of a particular sprocket when said chain is being shifted by said derailleur onto said particular sprocket, said length of said control cable being adjustable to cause said chain guide to be in said proper position within said stable region of said particular sprocket, said device comprising:

(a) a mounting member,
(b) an adjuster comprising (i) a shaft screwably mounted on said mounting member such that said adjuster is axially movable with respect to said mounting member responsive to rotation of said shaft relative to said mounting member and (ii) a receiving portion for receiving therein said control cable,
(c) a clicking mechanism for providing a clicking noise each time said adjuster is rotated by a given angle relative to said mounting member, said clicking mechanism including a temporary stop means including a clicking member supported non-rotatably relative to said adjuster and including a plurality of engaging protuberances, said mounting member including a plurality of engaging recesses for engagement with said engaging protuberances, and a spring means interposed between said adjuster and said clicking member to bias said clicking member toward said mounting member, said given angle having a magnitude such that when said adjuster is rotated by said given angle, said length of said control cable is adjusted and said chain guide is adjusted in position an amount adapted to be one of (i) equal to and (ii) slightly less than said predetermined width of said stable region, whereby when said chain guide is located outside said stable region and said adjuster is rotated by said given angle, said chain guide is positioned in said proper position within said region.

2. An adjusting device for a control cable according to claim 1, wherein said clicking member comprises a cylindrical member having a bottom portion and covering said adjuster, said bottom portion being disposed opposite at its outer surface to said mounting member, said temporary stop means being provided between said outer surface of said bottom portion and said mounting member, said cylindrical member housing at an inner surface side of said bottom portion said biasing means for biasing said clicking member toward said mounting member, said adjusting device further comprising a coupling means disposed between said clicking member and said adjuster, said coupling means being provided to couple said adjuster with said clicking member such that said adjuster is non-rotatable and axially movable relative to said clicking member, and said clicking member further having at its outer periphery a rotary control portion.

3. An adjusting device for a control cable according to claim 2, wherein said clicking member is spline-coupled with an outer periphery of said receiving portion of said adjuster.

4. An adjusting device for a control cable according to claim 1, wherein said temporary stop means comprises a clicking member provided at said mounting member, said clicking member being rotatable relative to said adjuster, said clicking member being disposed opposite to said adjuster so that said clicking member and said adjuster have opposite surfaces, one of said opposite surfaces of said clicking member and said adjuster comprising engaging recesses and the other of said opposite surfaces of said clicking member and said adjuster comprising engaging protuberances engageable with said engaging recesses to temporarily stop rotation of said adjuster, said temporary stop means further providing a biasing means for elastically engaging said engaging protuberances with said engaging recesses respectively.

5. An adjusting device for a control cable according to claim 1, wherein said temporary stop means comprises engaging recesses provided at the outer periphery of said adjuster and an engaging member elastically engageable with respective ones of said engaging recesses.

6. An adjusting device for a control cable according to claim 1, wherein said mounting member includes a threaded bore screwable with said shaft of said adjuster, both said threaded bore and said shaft screwable therewith being angular in section, a circumference of said threaded bore of said mounting member being formed of an elastic material.

7. An adjusting device for a control cable according to claim 1, further comprising an operating member and wherein an outer periphery of said shaft of said adjuster includes a screw thread with which said operating member is screwably connected, said mounting member including a throughbore into which said shaft of said adjuster is received, said shaft of said adjuster being fitted into said throughbore of said mounting member such that it is non-rotatable and axially movable relative thereto, said temporary stop means being disposed between said operating member and said mounting member, said adjuster further having a lock means for said throughbore.

8. An adjusting device for a control cable according to claim 7, wherein said lock means is positioned at said temporary stop means.

9. An adjusting device for a control cable according to claim 7, wherein said shaft of said adjuster passes through said throughbore to project outwardly therefrom such that a portion of said shaft of said adjuster projecting from said throughbore provides a locking member, so that between said locking member and said mounting member is provided a biasing means for biasing said operating member toward said mounting member.

* * * * *